United States Patent
Baboescu et al.

(10) Patent No.: US 10,440,622 B2
(45) Date of Patent: Oct. 8, 2019

(54) WLAN OFFLOADING USING OFFLOAD PREFERENCE INDICATION INFORMATION

(71) Applicant: Avago Technologies International Sales Pte. Limited, Singapore (SG)

(72) Inventors: Florin Baboescu, Solana Beach, CA (US); Guillaume Jacques Sebire, Espoo (FI); Dutt Kalapatapu, Santa Clara, CA (US); Hannu Hietalahti, Kiviniemi (FI)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 14/688,771

(22) Filed: Apr. 16, 2015

(65) Prior Publication Data

US 2015/0304922 A1 Oct. 22, 2015

Related U.S. Application Data

(60) Provisional application No. 61/981,590, filed on Apr. 18, 2014.

(51) Int. Cl.
*H04W 36/14* (2009.01)
*H04W 28/08* (2009.01)
(Continued)

(52) U.S. Cl.
CPC ........... *H04W 36/14* (2013.01); *H04W 28/08* (2013.01); *H04W 48/18* (2013.01); *H04W 36/22* (2013.01); *H04W 88/06* (2013.01)

(58) Field of Classification Search
CPC ...... H04L 12/26; H04W 28/08; H04W 88/06; H04W 36/12–14; H04W 36/22; H04W 48/18
See application file for complete search history.

(56) References Cited

U.S. PATENT DOCUMENTS 7,370,100 B1 * 5/2008 Gunturu .............. H04L 67/1029
703/2
8,428,612 B2 4/2013 Lee
(Continued)

FOREIGN PATENT DOCUMENTS

CN 101873637 A 10/2010
CN 102833274 A 12/2012

OTHER PUBLICATIONS

3GPP TSG-RAN2 Meeting #85 R2-140842, Prague, Czech Republic, Feb. 10-14, 2014, 17 pages.
(Continued)

*Primary Examiner* — Noel R Beharry
*Assistant Examiner* — Richard Schnell
(74) *Attorney, Agent, or Firm* — Sterne, Kessler, Goldstein & Fox P.L.L.C.

(57) ABSTRACT

Systems and methods are disclosed for offloading traffic from a first network to a second network using offload preference indication (OPI) information. The OPI information can be sent to a mobile communication device using the Access Network Discovery and Selection Function (ANDSF) framework or Radio Access Network (RAN) rules. Systems and methods are disclosed for offloading traffic for users in user groups using a variety of techniques, including randomization techniques, assigned offload class techniques, and bitmap allocation techniques.

14 Claims, 12 Drawing Sheets

(51) Int. Cl.
*H04W 48/18* (2009.01)
*H04W 36/22* (2009.01)
*H04W 88/06* (2009.01)

(56) References Cited

U.S. PATENT DOCUMENTS

| | | | |
|---|---|---|---|
| 8,797,856 B1* | 8/2014 | Ballal | H04W 4/005 370/230 |
| 2009/0092080 A1 | 4/2009 | Balasubramanian et al. | |
| 2011/0188485 A1 | 8/2011 | Fodor et al. | |
| 2012/0026880 A1 | 2/2012 | Miller et al. | |
| 2012/0236753 A1* | 9/2012 | Rados | H04L 65/1016 370/253 |
| 2013/0231080 A1* | 9/2013 | Cheuk | H04M 15/765 455/405 |
| 2013/0232555 A1* | 9/2013 | Zhang | H04W 12/08 726/4 |
| 2014/0295843 A1* | 10/2014 | Van Der Velde | H04W 36/22 455/436 |
| 2015/0043566 A1* | 2/2015 | Wu | H04W 48/16 370/338 |
| 2015/0092553 A1* | 4/2015 | Sirotkin | H04W 28/08 370/235 |
| 2015/0282045 A1* | 10/2015 | Salem | H04W 40/10 370/329 |
| 2016/0029295 A1* | 1/2016 | Nagasaka | H04W 48/18 370/237 |

OTHER PUBLICATIONS

Official Action, dated Feb. 5, 2018, for Chinese Patent Appl. No. 201510188626.4, 15 pages including English translation.
Broadcom Corporation, "WLAN Interworking: OPI," 3GPP Draft No. S2-141197, SA WG2, Mar. 23, 2014, retrieved from Internet at http://www.3gpp.org/ftp/Meetings_3GPP_SYNC/SA2/Docs/, 2 pages.
Ericsson et al., "Policy based on OPI," 3GPP Draft No. S2-140951, Mar. 23, 2014, retrieved from Internet at http://www.3gpp.org/ftp/Meetings_3GPP_SYNC/SA2/Docs/, 3 pages.
AT&T et al., "OPI evaluation and use in ANDSF policies," 3GPP Draft No. S2-141202, Mar. 23, 2014, retrieved from Internet at http://www.3gpp.org/ftp/Meetings__3GPP_SYNC/SA2/Docs/, 3 pages.
Alcatel-Lucent et al., "Discussion on framework for selection of 3GPP/WiFi interworking method including OPI definition," 3GPP Draft No. S2-141104, Mar. 23, 2014, retrieved from Internet at http://www.3gpp.org/ftp/Meetings_3GPP_SYNC/SA2/Docs/, 4 pages.
Partial European Search Report, dated Sep. 15, 2015, for European Patent Appl. No. 15163964.8, 6 pages.
Extended European Search Report, dated Jan. 14, 2016, for European Patent Appl. No. 15163964.8, 12 pages.
Communication pursuant Article 94(3) EPC, dated Jan. 14, 2016, for European Patent Appl. No. 15163964.8, 5 pages.
English language abstract for Chines Patent Publication No. CN 102833274 A, published Dec. 19, 2012, 1 page.

* cited by examiner

WLAN OFFLOADING USING OFFLOAD PREFERENCE INDICATION INFORMATION

CROSS REFERENCE TO RELATED APPLICATIONS

This application claims the benefit of U.S. Provisional Patent Application No. 61/981,590, filed on Apr. 18, 2014, which is incorporated by reference herein in its entirety.

FIELD

This application relates generally to wireless communications, including offloading within a communication environment.

BACKGROUND

The cellular network industry and service providers have been developing inter-system offloading solutions to alleviate congestion within communication environments by delivering data originally targeted for cellular networks to one or more other complementary technologies such as Wireless Local Area Network (WLAN) technology. Inter-system offloading can reduce congestion issues and provide flexible bandwidth for load-balancing.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 10:
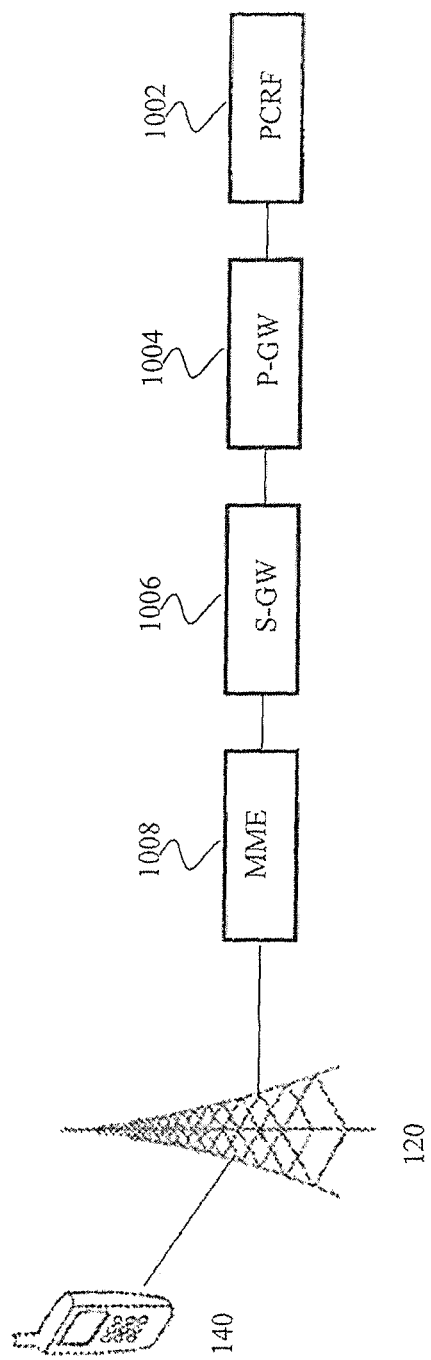
Figure 11:
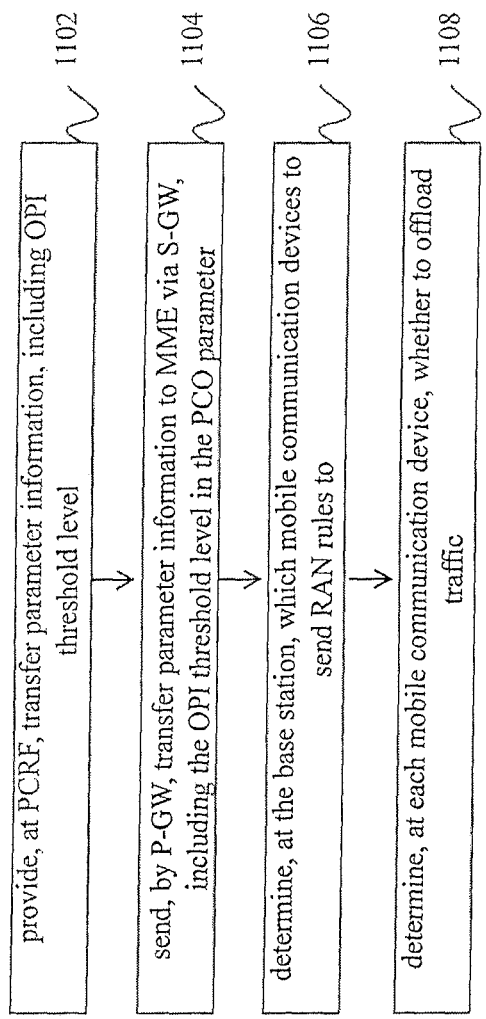

FIG. 10 is a network diagram illustrating how the policy and charging rules function (PCRF) can provide threshold information to mobile communication device(s) using radio access network (RAN) rules in accordance with an embodiment of the present disclosure; and FIG. 11 is a flowchart of a method for providing threshold information to mobile communication device(s) using radio access network (RAN) rules in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. For purposes of this discussion, the term "module" shall be understood to include one of software, or firmware, or hardware (such as circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. Communication Environment

Figure 1:
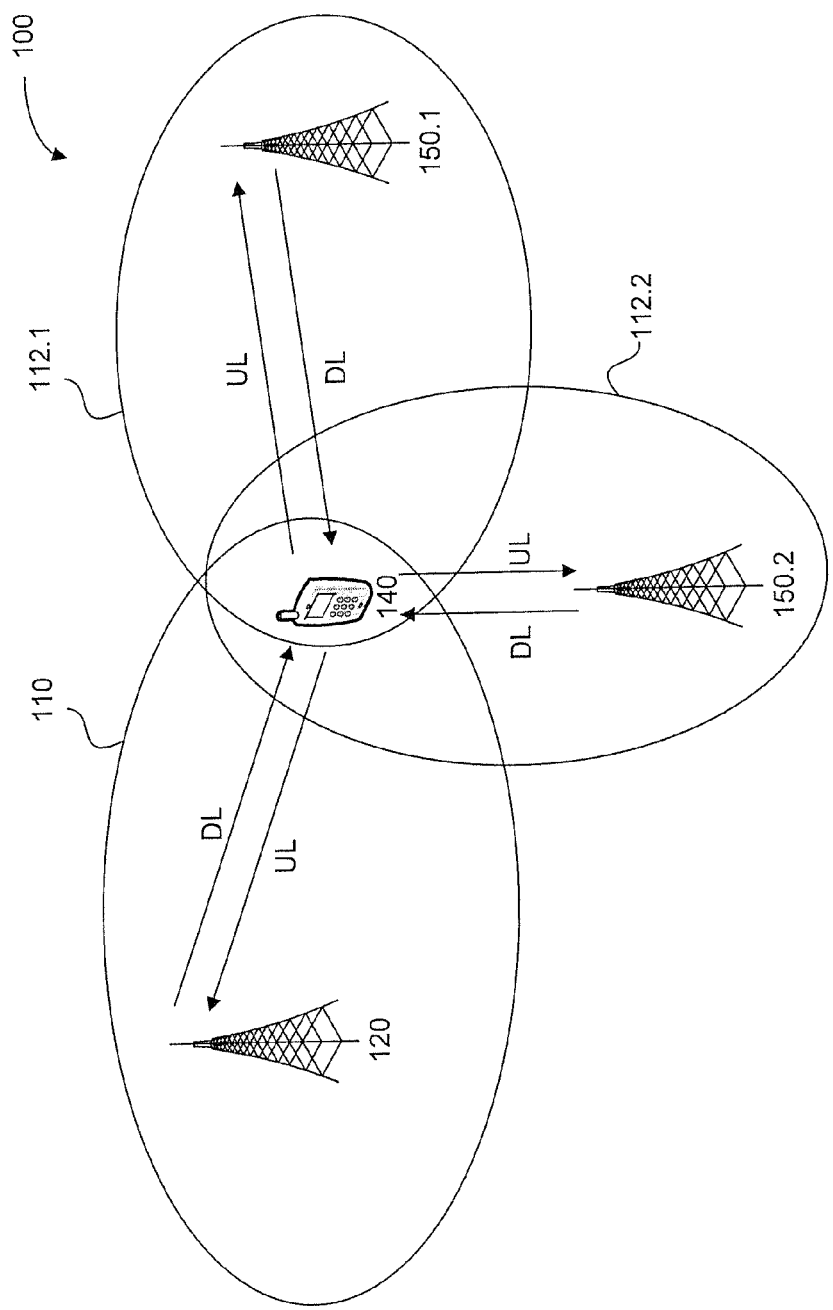
FIG. 1 illustrates an example network environment.

FIG. 1 illustrates an example communication environment 100 that includes one or more base stations 120, one or more mobile communication devices 140, and one or more access points (APs) 150. The base station(s) 120, mobile communication device(s) 140, and AP(s) 150 each include one or more processors, circuitry, and/or logic that is configured to communicate via one or more wireless technologies. The one or more processors can include (and be configured to access) one or more internal and/or external memories that store instructions and/or code that, when executed by the processor(s), cause the processor(s) to perform one or more operations to facilitate communications via one or more wireless technologies as discussed herein. Further, one or more of the mobile communication devices 140 can be configured to support co-existing wireless communications. The mobile communication device(s) 140 can include, for example, a transceiver having one or more processors, circuitry, and/or logic that is configured to transmit and/or receive wireless communications via one or more wireless technologies within the communication environment 100.

The base station(s) 120 and AP(s) 150 each include one or more processors, circuitry, and/or logic that is configured to: (1) receive one or more wired communications via one or more well-known wired technologies (e.g., within a core (backhaul) network) and transmit one or more corresponding wireless communications via one or more wireless technologies within the communication environment 100, (2) receive one or more wireless communications within the communication environment 100 via one or more wireless technologies and transmit one or more corresponding wired communications via one or more well-known wired technologies within a core network, and (3) to transmit and/or receive wireless communications via one or more wireless technologies within the communication environment 100. The wireless technologies can include, for example, one or more wireless protocols discussed above. The number of mobile communication devices 140, base stations 120 and/or APs 150 are not limited to the numbers shown in the exemplary embodiment illustrated in FIG. 1, and the communication environment 100 can include any number of mobile communication devices 140, base stations 120 and/or APs 150 as would be understood by those skilled in the relevant arts without departing from the spirit and scope of the present disclosure.

The mobile communication device 140 can be configured to communicate with the base station 120 in a serving cell or sector 110 of the communication environment 100, to communicate with the access point (AP) 150.1 in a wireless local area network (WLAN) 112.1 and/or to communicate with the AP 150.2 in a WLAN 112.2. For example, the mobile communication device 140 receives signals on one or more downlink (DL) channels and transmits signals to the base station 120, AP 150.1 and/or the AP 150.2 on one or more respective uplink (UL) channels. In exemplary embodiments, the mobile communication device 140 can be configured to utilize the Access Network Query Protocol (ANQP) to exchange information with the APs 150. Further, one or more of the APs 150 can be Hotspot 2.0 compliant, as defined in the IEEE 802.11u standard. In these examples, the mobile communication device 140 can be configured to exchange backhaul bandwidth and/or data rate information, connectivity information, capability information, and any other connection and/or communication information associated with the AP(s) 150 as would be understood by those skilled in the relevant arts utilizing the ANQP.

In an exemplary embodiment, one or more of the base stations 120 includes one or more processors, circuitry, and/or logic that is configured for communications conforming to 3GPP's Long-Term Evolution (LTE) specification (e.g., the base station is an LTE base station), one or more of the APs 150 includes one or more processors, circuitry, and/or logic that is configured for communications conforming to IEEE's 802.11 WLAN specification (e.g., the AP 150 is a WLAN access point), and one or more of the mobile communication devices 140 include one or more processors, circuitry, and/or logic that is configured for communications conforming to 3GPP's LTE specification and IEEE's 802.11 WLAN specification. The one or more processors, circuitry, and/or logic of the mobile communication device 140 can be further configured for communications conforming to one or more other 3GPP and/or non-3GPP protocols via one or more device-to-device communication networks established with one or more other mobile communication devices. That is, the mobile communication device(s) 140 are configured to wirelessly communicate with the base station(s) 120 utilizing 3GPP's LTE specification, with the AP(s) 150 utilizing IEEE's 802.11 WLAN specification, and/or with one or more other mobile communication devices 140 directly utilizing 3GPP's LTE specification, IEEE's 802.11 WLAN specification, and/or one or more other 3GPP and/or non-3GPP protocols. In this example, the serving cell or sector 110 is an LTE serving cell or sector and the WLANs 112 are WLANs utilizing the 802.11 WLAN specification. In an exemplary embodiment, the communication of the mobile communication device 140 with one or more other mobile communication devices 140 can be a device-to-device communication that bypasses the base station 120, the AP 150, and/or any other base station and/or AP.

Those skilled in the relevant art(s) will understand that the base station(s) 120, the AP(s) 150, and the mobile communication device(s) 140 are not limited to these exemplary 3GPP and non-3GPP wireless protocols, and the base station(s) 120, the AP(s) 150, and/or the mobile communication device(s) 140 can be configured for wireless communications conforming to one or more other 3GPP and/or non-3GPP wireless protocols in addition to, or in the alternative to, the wireless protocols discussed herein. Examples of the mobile communication device 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some embodiments, the mobile communication device 140 may be a stationary device, including, for example, a stationary computing device—such as a personal computer (PC), a desktop computer, a computerized kiosk, and an automotive/aeronautical/maritime in-dash computer terminal.

1.1 Base Station

Figure 2:
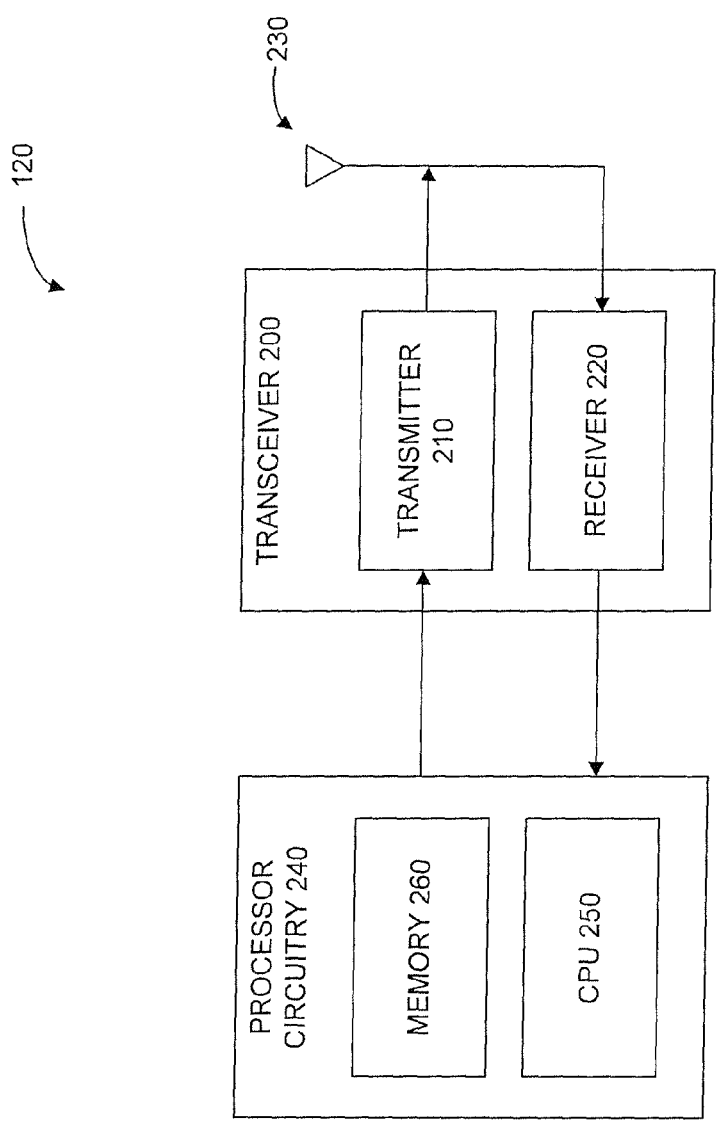
FIG. 2 illustrates a base station according to an exemplary embodiment of the present disclosure.

FIG. 2 illustrates the base station 120 according to an exemplary embodiment of the present disclosure. For example, the base station 120 can include a transceiver 200 communicatively coupled to processor circuitry 240. The transceiver 200 includes one or more processors, circuitry, and/or logic that is configured to transmit and/or receive wireless communications via one or more wireless technologies within the communication environment 100. In particular, the transceiver 200 can include a transmitter 210 and a receiver 220 that have one or more processors, circuitry, and/or logic configured to transmit and receive wireless communications, respectively, via one or more antennas 230. Those skilled in the relevant art(s) will recognize that the transceiver 200 can also include (but are not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the base station 120 can be configured for wireless communication utilizing a Multiple-input Multiple-output (MIMO) configuration.

In an exemplary embodiment, the transceiver 200 is configured for wireless communications conforming to one or more wireless protocols defined by 3GPP. For example, the transceiver 200 is configured for wireless communications conforming to 3GPP's LTE specification. In this example, the transceiver 200 can be referred to as LTE transceiver 200. Those skilled in the relevant art(s) will understand that the transceiver 200 is not limited to communication conforming to 3GPP's LTE specification, and can be configured for communications that conform to one or more other 3GPP protocols and/or one or more non-3GPP protocols. It should be appreciated that the transceiver 200 can be referred to by one or more other 3GPP and/or non-3GPP protocols in embodiments where the transceiver 200 is configured for such other communications conforming to the other 3GPP and/or non-3GPP protocols.

The processor circuitry 240 can include one or more processors (CPUs) 250 and/or circuits configured to carry out instructions to perform arithmetical, logical, and/or input/output (I/O) operations of the base station 120 and/or one or more components of the base station 120. The processor circuitry 240 can further include a memory 260 that stores data and/or instructions, where when the instructions are executed by the processor(s) 250, perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

1.2 Access Point

Figure 3:
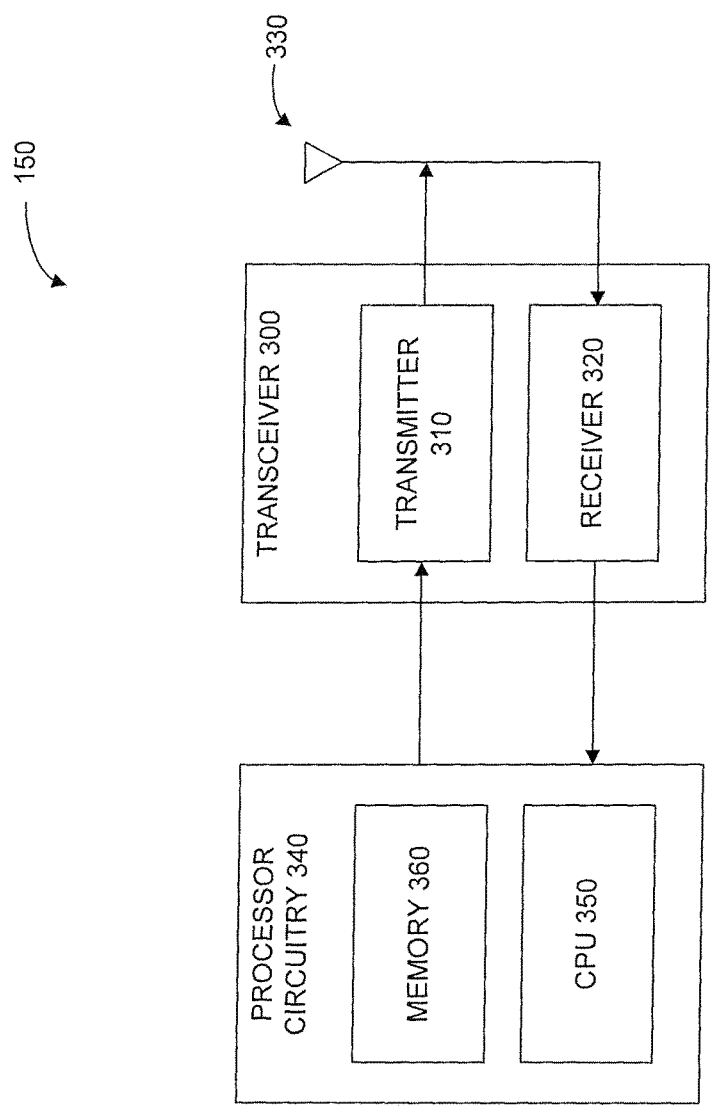
FIG. 3 illustrates an access point according to an exemplary embodiment of the present disclosure.

FIG. 3 illustrates the access point (AP) 150 according to an exemplary embodiment of the present disclosure. For example, the AP 150 can include a transceiver 300 communicatively coupled to processor circuitry 340. The transceiver 300 is similar to the transceiver 200 and includes one or more processors, circuitry, and/or logic that is configured to transmit and/or receive wireless communications via one or more wireless technologies within the communication environment 100. In particular, the transceiver 300 can similarly include a transmitter 310 and a receiver 320 that have one or more processors, circuitry, and/or logic configured to transmit and receive wireless communications, respectively, via one or more antennas 330. Those skilled in the relevant art(s) will recognize that the transceiver 300 can also include (but are not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 330 may include an integer array of antennas, and that the antenna 330 may be capable of both transmitting and receiving wireless communication signals. For example, the AP 150 can be configured for wireless communication utilizing a Multiple-input Multiple-output (MIMO) configuration.

In an exemplary embodiment, the transceiver 300 is configured for wireless communications conforming to one or more non-3GPP protocols. For example, the transceiver 300 is configured for wireless communications conforming to IEEE's 802.11 WLAN specification. In this example, the transceiver 300 can be referred to as WLAN transceiver 300. Those skilled in the relevant art(s) will understand that the transceiver 300 is not limited to communication conforming to IEEE's 802.11 WLAN specification, and can be configured for communications that conform to one or more other non-3GPP protocols and/or one or more 3GPP protocols. It should be appreciated that the transceiver 300 can be referred to by one or more other 3GPP and/or non-3GPP protocols in embodiments where the transceiver 300 is configured for such other communications conforming to the other non-3GPP and/or 3GPP protocols.

The processor circuitry 340 is similar to the processor circuitry 240 and includes one or more processors, circuitry, and/or logic that is configured to control the overall operation of the AP 150, including the operation of the transceiver 300. The processor circuitry 340 can include one or more processors (CPUs) 350 and/or circuits configured to carry out instructions to perform arithmetical, logical, and/or input/output (I/O) operations of the AP 150 and/or one or more components of the AP 150. The processor circuitry 340 can further include a memory 360 that stores data and/or instructions, where when the instructions are executed by the processor(s) 350, perform the functions described herein. The memory 360 can be any well-known volatile and/or non-volatile memory similar to the memory 260 described above. Similarly, the memory 360 can be non-removable, removable, or a combination of both.

1.3 Mobile Communication Device

Figure 4:
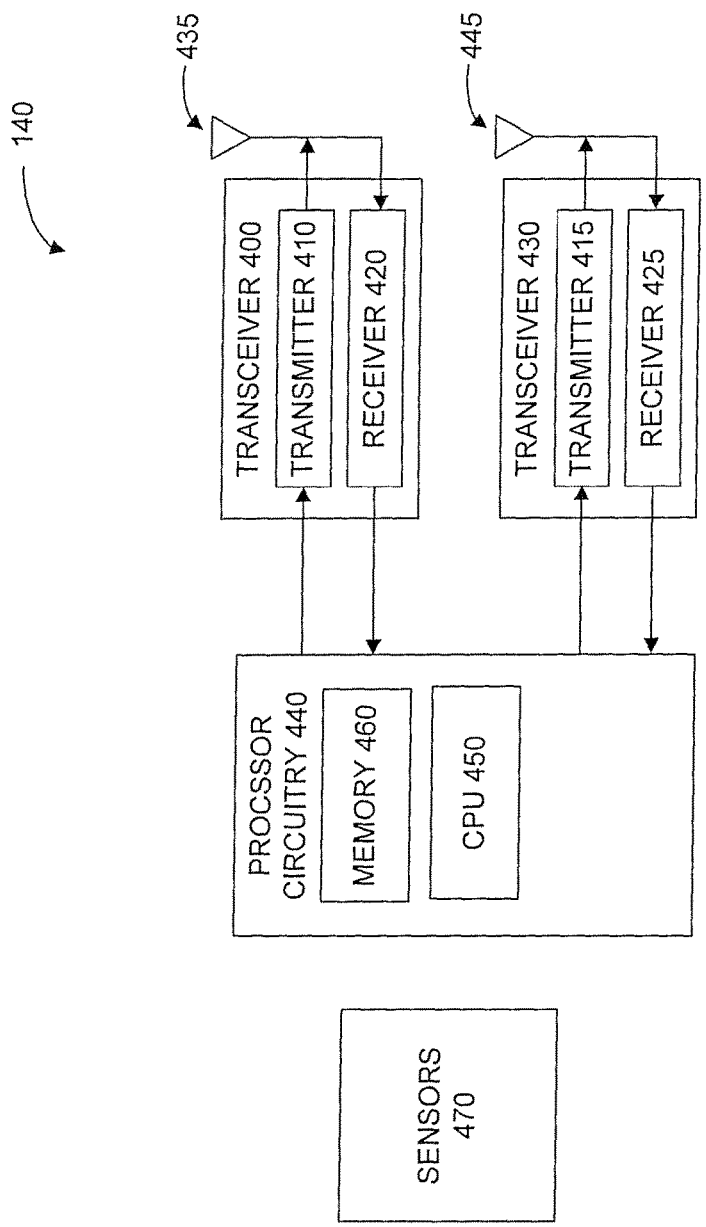
FIG. 4 illustrates a mobile communication device according to an exemplary embodiment of the present disclosure.

FIG. 4 illustrates the mobile communication device 140 according to an exemplary embodiment of the present disclosure. The mobile communication device 140 can include processor circuitry 440 communicatively coupled to an LTE transceiver 400 and a WLAN transceiver 430. The mobile communication device 140 can be configured for wireless communications conforming to one or more wireless protocols defined by 3GPP and/or one or more non-3GPP wireless protocols. In an exemplary embodiment, the mobile communication device 140 is configured for wireless communication conforming to 3GPP's LTE specification and for wireless communication conforming to IEEE's 802.11 WLAN specification. Those skilled in the relevant art(s) will understand that the mobile communication device 140 is not limited to these exemplary 3GPP and non-3GPP wireless protocols, and the mobile communication device 140 can be configured for wireless communications conforming to one or more other 3GPP and/or non-3GPP wireless protocols in addition to, or in the alternative to, the wireless protocols discussed herein, and/or to a subset of the LTE and WLAN specifications discussed above.

The LTE transceiver 400 includes one or more processors, circuitry, and/or logic that is configured for transmitting and/or receiving wireless communications conforming to 3GPP's LTE specification. In particular, the LTE transceiver 400 can include an LTE transmitter 410 and an LTE receiver 420 that have one or more processors, circuitry, and/or logic configured for transmitting and receiving wireless communications conforming to 3GPP's LTE specification, respectively, via one or more antennas 435. Transceiver 400 need not be limited to LTE, and could operate according to one or more other 3GPP and/or non-3GPP protocols, as will be understood by those skilled in art. The WLAN transceiver 430 includes one or more processors, circuitry, and/or logic that is configured for transmitting and/or receiving wireless communications conforming to IEEE's 802.11 WLAN specification. In particular, the WLAN transceiver 430 can include a WLAN transmitter 415 and a WLAN receiver 425 that have one or more processors, circuitry, and/or logic configured for transmitting and receiving wireless communications conforming to IEEE's 802.11 WLAN specification, respectively, via one or more antennas 445. Transceiver 430 need not be limited to WLAN, and could operate according to one or more other 3GPP and/or non-3GPP protocols, as will be understood by those skilled in art.

Regarding the LTE transceiver 400 and the WLAN transceiver 430, the processes for transmitting and/or receiving wireless communications can include (but are not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that antennas 435 and/or 445 may include an integer array of antennas, and that the antennas may be capable of both transmitting and receiving wireless communication signals. It will also be understood by those skilled in the relevant art(s) that any combination of the LTE transceiver 400 and WLAN transceiver 430, as well as one or more other transceivers, circuits, and/or processors may be embodied in a single chip and/or die.

The processor circuitry 440 includes one or more processors, circuitry, and/or logic that is configured to control the overall operation of the mobile communication device 140, including the operation of the LTE transceiver 400 and WLAN transceiver 430. The processor circuitry 440 can include one or more processors (CPUs) 450 and/or circuits configured to carry out instructions to perform arithmetical, logical, and/or input/output (I/O) operations of the mobile communication device 140 and/or one or more components of the mobile communication device 140. The processor circuitry 440 can further include a memory 460 that stores data and/or instructions, where when the instructions are executed by the processor(s) 450, perform the functions described herein. Similarly, the memory 460 can be any well-known volatile and/or non-volatile memory, and can be non-removable, removable, or a combination of both.

In an exemplary embodiment, the mobile communication device 140 includes one or more other transceivers (not shown) configured to communicate via one or more 3GPP protocols, one or more non-3GPP protocols, and/or one or more other well-known communication technologies. In an exemplary embodiment, the one or more other transceivers can be configured for navigational purposes utilizing one or more well-known navigational systems, including the Global Navigation Satellite System (GNSS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS) to provide some examples. Further, the mobile communication device 140 can include one or more positional and/or movement sensors 470 (e.g., GPS, accelerometer, gyroscope sensor, etc.) implemented in (and/or in communication with) the mobile communication device 140. Here, the location and/or movement of the mobile communication device 140 can be determined using one or more transceivers configured for navigation purposes, one or more of the positional and/or movement sensors 470, and/or one or more positional determinations using signal characteristics relative to one or more base stations and/or access points.

2. Offloading

In an exemplary embodiment, the processor circuitry 440 is configured to offload communications via the LTE or WLAN transceivers 400, 430. For example, the processor circuitry 400 can offload data from one or more base stations 120 and/or APs 150 to one or more other base stations 120 and/or AP 150. Alternatively, the processor circuitry 400 can offload communications via the LTE transceiver 400 to the WLAN transceiver 430, and/or can offload communications via the WLAN transceiver 430 to the LTE transceiver 400. The offloading can be based on one or more offloading policies provided to the mobile device 140 by one or more service providers and received via the LTE transceiver 400 and/or the WLAN transceiver 430. Further, the offloading policies can be stored in the memory 460, and accessed and executed by the CPU 450 to effectuate the offloading of communications. For example, the processor circuitry 440 can be configured to control the mobile communication device 140 to offload communications with the base station 120 to the AP 150.1 based on one or more of the offloading policies. In exemplary embodiments, the offloading policies can include priority information and/or utility information that can be used to determine an appropriate offloading policy to be implemented by the mobile communication device 140. In these examples, the mobile communication device 140 can select an offloading policy from one or more offloading polices based on, for example, utility information associated with the offloading policy.

The offloading of communications with the mobile communication device 140 can be from the base station 120 to the AP 150, from the AP 150 to the base station 120, or a combination of both. For example, the mobile communication device 140 can be configured to offload communications with the base station 120 to the AP 150 based on one or more offloading policies provided to the mobile communication device 140 by one or more service providers. The offloading policies can be application specific for separate applications (e.g. voice, data, background, push applications) operating on the mobile communication device 140. In an exemplary embodiment, the offloading policies are maintained in a policy server that is communicatively coupled to the mobile communication device 140 via one or more communication networks associated with the one or more service providers. For example, the policy server can be communicatively coupled to the base station 120 (via a backhaul connection), and then wirelessly provided to the mobile communication device 140 via the LTE network supported by the base station 120.

The offloading policies can be received by the mobile communication device 140 via the LTE transceiver 400 and/or the WLAN transceiver 430 from the one or more service providers. Further, the offloading policies can be either statically pre-configured on the mobile communication device 140 or dynamically updated by the service provider and provided to the mobile communication device 140. The policies can be stored in the memory 460, and accessed and executed by the CPU 450 to effectuate the offloading of communications between the mobile communication device 140 and base station 120 and/or the AP 150. The offloading policies can include, for example, one or more rules associated with the location of one or more communication networks, priority and/or utility information associated with one or more communication networks and/or one or more applications operable by the mobile communication device 140, the location of the mobile communication device 140, the available communication networks at specified locations, the day of week, the time of day, discovery information corresponding to the various communication networks, and/or any other information as would be apparent to those skilled in the relevant arts.

In operation, the mobile communication device 140 can analyze one or more of the parameters defined in the offloading policy (e.g., utility information) based on the operating state of the mobile communication device 140 (e.g., which applications are currently being utilized by the mobile communication device 140). Based on this analysis, the mobile communication device 140 determines whether to perform an offloading operation to another communication network, and if so, which communications and to what other communication network the communications are to be offloaded to.

3. ANDSF Framework

In an exemplary embodiment, the one or more offloading policies conform to, and/or are associated with, the Access Network Discovery and Selection Function (ANDSF) framework as defined in the 3GPP TS 24.312 specification, which is incorporated herein by reference in its entirety. The ANDSF framework is an entity introduced by 3GPP as part of the Release 8 set of specifications, within an Evolved Packet Core (EPC) of the System Architecture Evolution (SAE) for 3GPP compliant communication networks. The ANDSF framework assists the mobile communication device 140 to discover one or more non-3GPP communication networks (e.g., WLAN, WIMAX, etc.) that can be used for data communications in addition to one or more 3GPP communication networks (e.g., LTE, HSPA, etc.) and to provide the mobile communication device 140 with rules (e.g., policy conditions) that control the connection to the 3GPP and/or non-3GPP communication networks. The use of operational parameters, policies, and/or conditions within an operational framework for inter-system offloading, and the transmission of the operational framework to a mobile communication device, is further described in U.S. patent application Ser. No. 14/149,681 filed Jan. 7, 2014, entitled "Systems And Methods For Network Discovery And Selection Using Contextual Information," and U.S. patent application Ser. No. 14/167,615 filed Jan. 29, 2014, entitled "System And Methods For Anonymous Crowdsourcing Of Network Condition Measurements," each of which is incorporated herein by reference in its entirety.

The ANDSF framework is defined by one or more ANDSF Management Objects (MO) that are generated by the service providers of the one or more 3GPP communication networks and provided to the mobile communication device 140. The ANDSF MOs of the framework can provide the mobile communication device 140 with the following information, based on the service provider's configuration:
1. Inter-System Mobility Policy (ISMP)—network selections rules for a mobile communication device with no more than one active communication network connection (e.g., either LTE or WLAN).
2. Inter-System Routing Policy (ISRP)—network selection rules for the mobile communication device with potentially more than one active communication network connection (e.g., both LTE and WLAN). Here, the mobile communication device may employ IP Flow Mobility (IFOM), Multiple Access Packet Data Networks (PDN) Connectivity (MAPCON) or non-seamless WLAN offloading according to operator policy and user preferences.
3. Discovery Information—a list of networks that may be available in the vicinity of the mobile communication device and information assisting the mobile communication device to expedite the connection to these networks.

In these examples, the ANDSF framework assists the mobile communication device 140 to discover communication networks in the vicinity of the mobile communication device 140 and prioritize/manage connections to the communication networks. The policies set forth in the ANDSF framework can be statically pre-configured on the mobile communication device or dynamically updated by the service provider and provided to the mobile communication device 140 via the Open Mobile Alliance (OMA) Device Management (DM) protocol specified by the OMA DM Working Group and the Data Synchronization (DS) Working Group. The OMA DM protocol is incorporated herein by reference in its entirety.

4. Offload Preference Indicator

ANDSF enables an operator to configure the mobile communication device(s) 140 with different policies that contain rules for different services (e.g., voice, internet streaming traffic, video conferencing services, etc.) that can be executed on the mobile communication device(s) 140. In an embodiment, an offload policy at each mobile communication device 140 has validity criteria that determine when each of these services should be offloaded. For example, in an embodiment, the mobile communication device(s) 140 can receive a signal from the base station 120 to determine when to offload traffic for each of these services.

In an embodiment, an offload preference indicator (OPI) can be used to implement a load balancing policy. For example, as the load on the base station 120 increases, the base station 120 can determine that more traffic should be offloaded. In an embodiment, the base station 120 can increase the amount of traffic to be offloaded by increasing the value of an OPI that it broadcasts. In an embodiment, the OPI can take the form of a numerical value, such as a sequence of binary bits or a scalar number. For example, each OPI value can determine a different set of services to be offloaded, and increasing the OPI instructs the mobile communication devices 140 to offload more services. This OPI can be tied to the policies at the mobile communication device(s) 140. When the mobile communication device(s) 140 receive a signal from the base station 120 indicating that the OPI has been incremented, the mobile communication device(s) 140 can determine, based on their policies, to offload (e.g., to WLAN) a set of services corresponding to the incremented OPI.

For example, if the OPI at the base station 120 is set to a value of 2, the base station 120 can send this value to the mobile communication device(s) 140. Based on its policy stored in memory 260, a specific mobile communication device 140 can determine that for an OPI value of 2, video conferencing services should be offloaded but internet streaming traffic should not be offloaded. When the base station 120 increases the OPI to 3, this mobile communication device 140 can determine, based on its policy, that now internet streaming traffic should be offloaded in addition to video conferencing services.

In an embodiment, each mobile communication device 140 can have a different offloading policy. For example, a different mobile communication device within the range of the base station 120 can be configured with a policy that determines that different types of traffic (e.g., other than internet streaming traffic) should be offloaded when the OPI is increased to 3. When the mobile communication device(s) 140 receive a signal from the base station 120 indicating that the OPI has been decremented, the mobile communication device(s) 140 can determine, based on their individual policies, that traffic for a set of services that was previously offloaded to WLAN should no longer be offloaded. As one of ordinary skill would understand, each OPI can be associated with one or more services, and the base station 120 can change the OPI in a variety of ways. For example, while incrementing and decrementing the OPI by integer steps of 1 has been discussed above, the base station can change the OPI by any number of integer steps (e.g., from 2 to 6 or from 12 to 5), thereby changing the offloading status of an increasing number of different types of services.

In an embodiment, when the mobile communication device(s) 140 offload traffic for a new set of services in response to an increase in the OPI, traffic for services that was previously offloaded continues to be offloaded, in addition to the traffic for the new set of services corresponding to the incremented OPI. For example, an OPI of 2 can correspond to traffic for video conferencing services, and an OPI value of 3 can correspond to internet streaming traffic. In an embodiment, when the OPI is increased to 3, traffic for services corresponding to all GPIs at or below 3 can be offloaded. In another embodiment, a policy at specific mobile communication device 140 can associate a different set of services with each OPI value. For example, in an embodiment, a policy at the mobile communication device 140 can determine that, for an OPI value of 2, video conferencing and text traffic should be offloaded, and for an OPI of 3, only internet streaming (but not video conferencing and text traffic) should be offloaded.

Figures 5A, 5B:
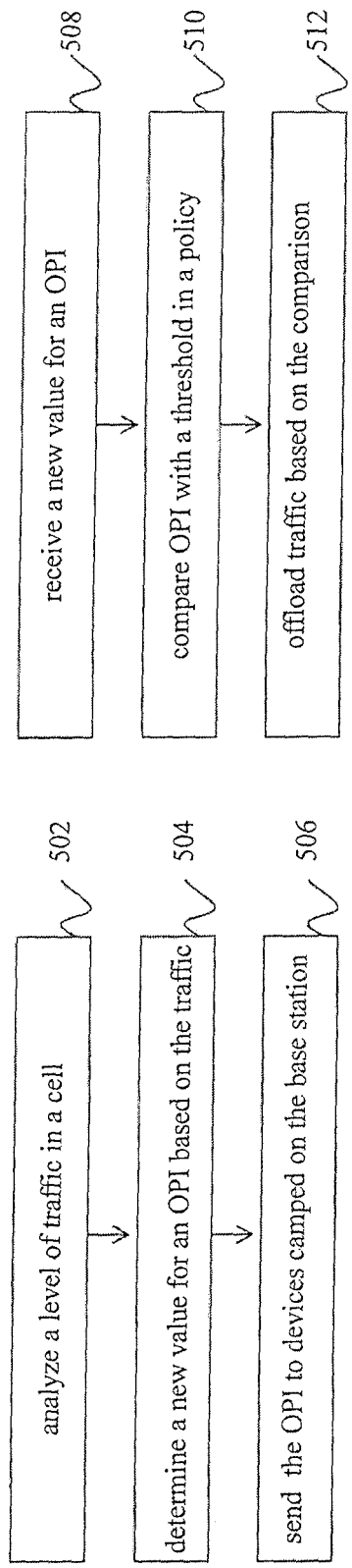
FIG. 5A is a flowchart of a method for sending an offload preference indicator (OPI) in accordance with an embodiment of the present disclosure.
FIG. 5B is a flowchart of a method for offloading traffic using an OPI in accordance with an embodiment of the present disclosure.

FIG. 5A is a flowchart of a method for sending an OPI in accordance with an embodiment of the present disclosure. In step 502, the base station 120 analyzes how much traffic there is in the serving cell 110. Based on the traffic, the base station 120 determines whether to determine a new OPI level (e.g., by incrementing or decrementing the OPT) based on the traffic. In step 506, the base station 120 sends the new OPI to mobile communication device(s) 140 camped on the serving cell 110. For example, in an embodiment, the base station 120 can perform these steps using instructions stored in memory 260 and executed on CPU 250. The steps in FIG. 5A can be repeated for new OPI values as traffic levels change over time.

FIG. 5B is a flowchart of a method for offloading traffic using an OPI in accordance with an embodiment of the present disclosure. In step 508, a mobile communication device 140 receives a new OPI value from the base station 120. The mobile communication device 140 can then determine how to offload traffic based on an offloading policy stored in memory 460. For example, this offloading policy can specify which services should have traffic offloaded for corresponding OPI values. In an embodiment, the policy can specify (e.g., in a table or other data structure) a threshold for each service (e.g., a threshold of 3 for internet streaming traffic) and can specify that traffic should be offloaded for a service when the threshold is reached. In step 510, the mobile communication device 140 compares the OPI with a threshold in the offloading policy. In step 512, the mobile communication device 140 offloads traffic (e.g., to WLAN) based on the comparison. In an embodiment, the mobile communication device 140 can perform these steps using instructions stored in memory 460 and executed on CPU 450. The steps in FIG. 5A can be repeated for new OPI values as traffic levels change over time.

4.1 User Groups

In an embodiment, the base station 120 can broadcast a value indicating that traffic should be offloaded for a specific set of users instead of all users camped on serving cell 110. For example, in an embodiment, subscribers of a service provider can be organized into different sub-groups (e.g., platinum/gold/silver/bronze subscribers). A service provider may want to specify that traffic for only certain of these sub-groups should be offloaded for a given OPI, so that bronze users are offloaded to WLAN first (e.g., when cellular load slightly increases), and gold users are kept on LTE until the LTE capacity reaches a certain point (e.g., as determined in their individual policies).

Figure 6A:
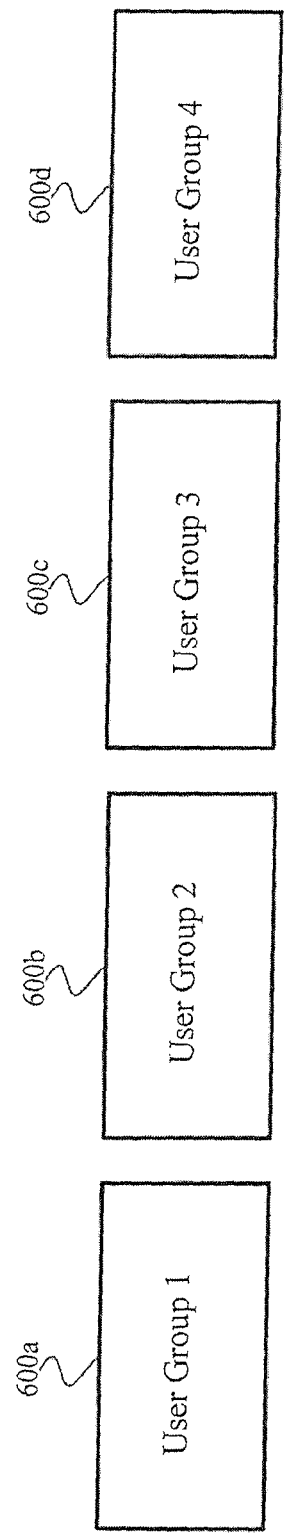
FIG. 6A is a block diagram showing user groups in accordance with an embodiment of the present disclosure.

FIG. 6A is a block diagram showing user groups 600 in accordance with an embodiment of the present disclosure. For example, in an embodiment, user group 600a can include platinum subscribers of a service provider, user group 600b can include gold subscribers, user group 600c can include silver subscribers, and user group 600d can include bronze subscribers. However, it should be understood that users can be divided into groups in any number of ways, as one of ordinary skill would understand. For example, in an embodiment, subscribers of a service provider can be divided equally among user groups 600. Additionally, while only 4 user groups are shown in FIG. 6A, as one of ordinary skill would understand, users can be divided into any number of groups.

Figure 6B:
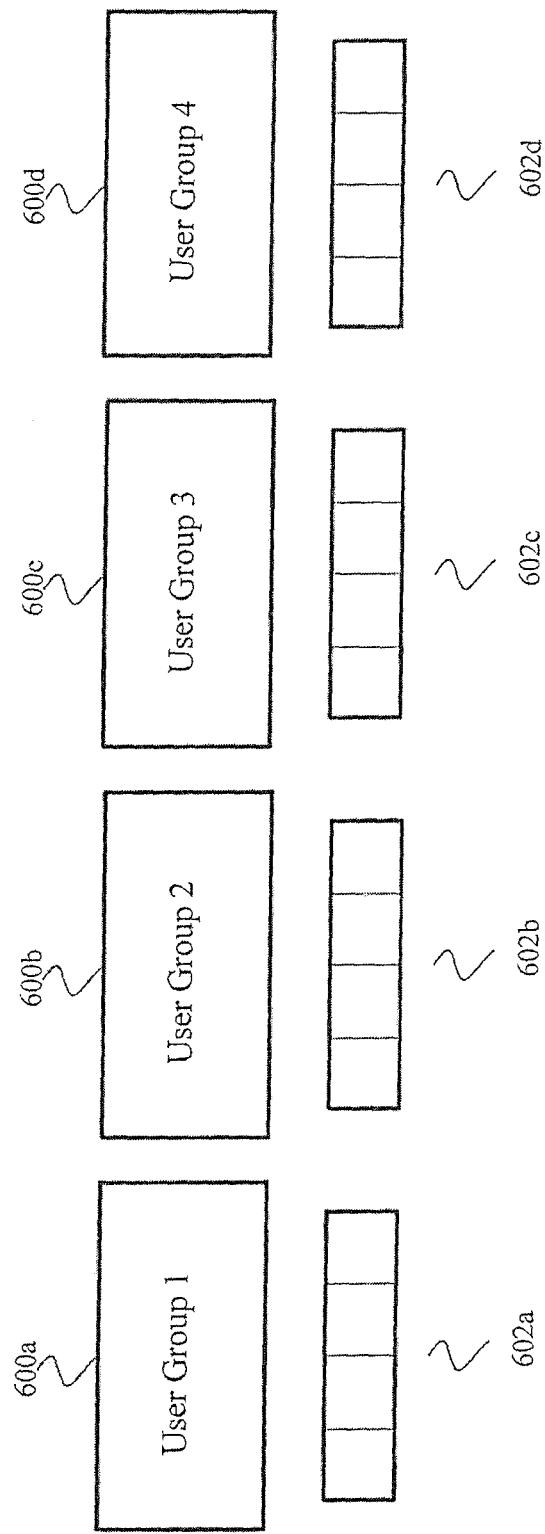
FIG. 6B is a block diagram illustrating the assignment of bits in a broadcasted value to user groups in accordance with an embodiment of the present disclosure.

In an embodiment, the base station 120 can assign a specific set of bits in a broadcasted value to each user group. For example, in an embodiment, the base station 120 can broadcast a 16 bit number, where each 4 bits in the 16 bit number are previously assigned to each of user groups 600. FIG. 5B shows a block diagram illustrating the assignment of bits in a broadcasted value to user groups 600 in accordance with an embodiment of the present disclosure. As illustrated by FIG. 6B, bits 602a are assigned to user group 600a, bits 602b are assigned to user group 600b, bits 602c are assigned to user group 600c, and bits 602d are assigned to user group 600d. While 4 sets of 4 bits are shown in FIG. 6B, it should be understood that any number of bits can be assigned to any number of user groups in accordance with embodiments of the present disclosure.

There are multiple ways that an OPI can be determined based on each set of bits (e.g., bits 602a). For example, in an embodiment, each bit in the 4 bit value can be assigned to a different type of service that can be offloaded. Alternatively, the 4 bits together can represent a scalar value, and a determination to offload traffic can be made based on this scalar value. Additionally, in an embodiment, the base station 120 can determine that traffic for a subset of users in each group can be offloaded, while traffic for other users is not. A variety of offloading techniques will be discussed in greater detail below.

4.2 Offloading for Users in a User Group Using Randomization

In an embodiment, the base station 120 can determine that traffic can be offloaded for a subset of users in a user group (e.g., a subset of users in user group 600b) by using a randomization technique to select a random number of the users in the group for which traffic will be offloaded. For example, in an embodiment, the base station 120 can broadcast a value $V_B$ to mobile communication devices (e.g., mobile communication device(s) 140) in user group 600b. Each mobile communication device 140 in user group 600b can generate a random number between 1 and $V_B$. The randomly generated number at each mobile communication device 140 in user group 600b can then be compared with a threshold set by a policy in each mobile communication device 140.

Based on this comparison, each mobile communication device 140 in user group 600b can determine whether wireless communications traffic ("traffic") should be offloaded. For example, in an embodiment, each mobile communication device 140 in user group 600b can determine that traffic should be offloaded if the randomly generated number is less than or equal to a threshold number in the policy at each mobile communication device 140 in user group 600b. However, it should be understood that policies in mobile communication device(s) 140 can also determine that traffic should be offloaded when, for example, the randomly generated number is greater than or equal to the threshold number in the policy.

For example, in an embodiment, the base station 120 can broadcast "0101" as $V_B$, which is equivalent to the scalar value "5." Each mobile communication device 140 in the user group 600b then generates a random number between 1 and 5. For example, a mobile communication device 140 can generate a random number of 3. This mobile communication device 140 then compares this randomly generated number "3" with a threshold set in its policy and determines whether traffic should be offloaded based on this comparison. For example, in an embodiment, if the policy sets a threshold value of "4" and specifies that traffic should be offloaded unless the randomly generated number is greater than or equal to the threshold (i.e., "4") then the mobile communication device 140 can determine that traffic should be offloaded because 3 is less than 4. It is noted that, by setting the trigger for an offload to occur below a threshold in a policy of the mobile device 140, the base station 120 can force an offload for all users in a user group by setting $V_B$=0 for that user group. Further, the randomization introduced by this process likely precludes that all users in a user group will offload at the same instant in time, which would could cause further unwanted traffic congestion.

The mobile communication device 140 can determine which traffic for particular services to offload in a variety of ways. For example, in an embodiment, the mobile communication device 140 can use the randomly generated number as its OPI and offload services corresponding to this OPI by consulting rules in its policy (e.g., offloading traffic for services corresponding to an OPI of "3" in its policy). In another embodiment, the mobile communication device 140 can use the $V_B$ transmitted to its user group as its OPI and can offload traffic for services corresponding to this OPI (e.g., offloading traffic for services corresponding to an OPI of "5" in its policy).

Figure 7:
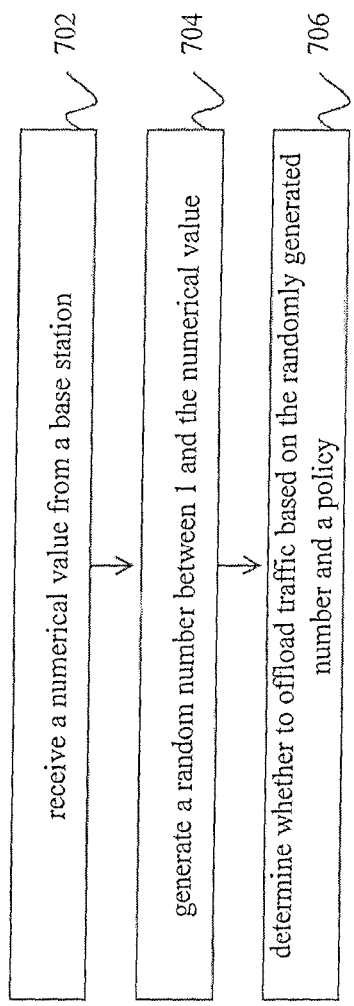
FIG. 7 is a flowchart of a method for offloading traffic for users in a user group using a randomization technique in accordance with an embodiment of the present disclosure.

FIG. 7 is a flowchart of a method for offloading traffic for users in a user group using a randomization technique in accordance with an embodiment of the present disclosure. In step 702, a mobile communication device 140 receives a numerical value $V_B$ from the base station 120. In step 704, the mobile communication device 140 generates a random number between 1 and $V_B$. In step 706, the mobile communication device 140 determines whether to offload traffic based on the randomly generated number and a policy (e.g., stored in memory 460). For example, in an embodiment, the mobile communication device 140 compares the randomly generated number with a threshold in the policy and determines whether the randomly generated number is less than or equal to the threshold. Based on the comparison, the mobile communication device 140 can determine whether to offload traffic and, for example, which traffic for particular services to offload. In an embodiment, the mobile communication device 140 can perform these steps using instructions stored in memory 460 and executed on CPU 450.

4.3 Offloading for Users in a User Group Using Assigned Offload Class

In an embodiment, the base station 120 can determine that traffic can be offloaded for a subset of users in a user group (e.g., a subset of users in user group 600a) by using one or more assigned offload classes to select users in the group for which traffic will be offloaded. For example, as discussed above, user group 600a can represent platinum subscribers (and can be assigned bits 602a), user group 600b can represent gold subscribers (and can be assigned bits 602b), user group 600c can represent silver subscribers (and can be assigned bits 602c), and user group 600d can represent bronze subscribers (and can be assigned bits 602d). Based on thresholds set in policies in mobile communication device(s) 140 in each user group 600, the mobile communication device(s) 140 can determine whether traffic should be offloaded.

For example, the base station can broadcast a 16 bit number: 0101 0111 0011 1010. In this 16 bit number, bits 602a will have the value 0101, bits 602b will have the value 0111, bits 602c will have the value 0011, and bits 602d will have the value 1010. This 16 bit number can be interpreted as the scalar numbers 5, 7, 3, and 10 assigned to user groups 600a, 600b, 600c, and 600d, respectively. If, for example, a policy of a mobile communication device 140 in user group 602b specifies a threshold of "8" and further specifies that traffic should be offloaded if the threshold is reached or exceeded, the mobile communication device 140 can determine that traffic should not be offloaded because the numerical value of the bits 602b broadcast to user group 600b did not meet or exceed the threshold.

As discussed above, the mobile communication device 140 can determine which traffic for particular services to offload in a variety of ways. For example, in an embodiment, the mobile communication device 140 can use the $V_B$ transmitted to its user group as its OPI and can offload services corresponding to this OPI by consulting rules in its policy for this OPI (e.g., offloading traffic for services corresponding to an OPI of "7" in its policy).

Figure 8:
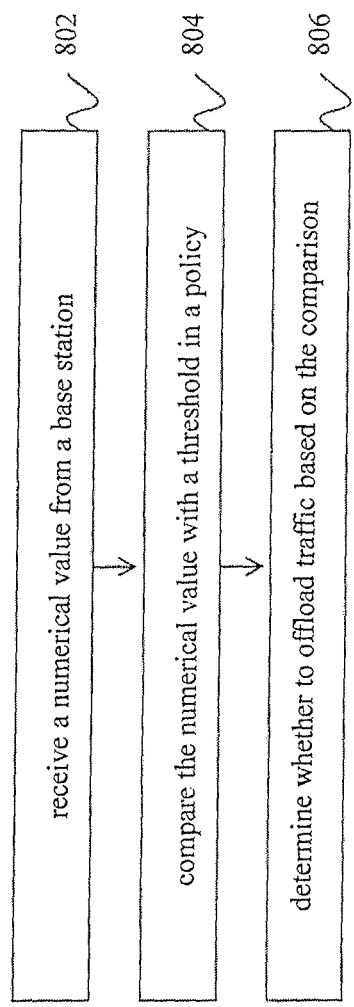
FIG. 8 is a flowchart of a method for offloading traffic for users in a user group using an assigned offload class in accordance with an embodiment of the present disclosure.

FIG. 8 is a flowchart of a method for offloading traffic for users in a user group using an assigned offload class in accordance with an embodiment of the present disclosure. In step 802, a mobile communication device 140 receives a numerical value $V_B$ from the base station 120. In step 804, the mobile communication device 140 compares the numerical value with a threshold in a policy (e.g., stored in memory 460). For example, in an embodiment, the mobile communication device 140 can determine, based on rules in the policy, whether the numerical value is less than or equal to the threshold. Based on the comparison, the mobile communication device 140 can determine whether to offload traffic in step 806. In an embodiment, the mobile communication device 140 can perform these steps using instructions stored in memory 460 and executed on CPU 450.

4.4 Offloading for Users in a User Group Using Bitmap Allocation

In an embodiment, the base station 120 can determine that traffic can be offloaded for users in a user group (e.g., users in user group 600a) by using a bitmap allocating different service(s) to each bit. For example, in an embodiment, one bit in a 4 bit set 602a can correspond to audio, one bit can correspond to video, one bit can correspond to data, and one bit can correspond to signaling. In an embodiment, the mobile communication device(s) 140 in each group 600a can compare the broadcasted bits to a bit vector in the policy at each mobile communication devices 140 using a logical operation (e.g., a binary operation) and can determine, based on the results of the logical operation, whether traffic should be offloaded.

For example, the base station 120 can broadcast "0110" to user group 600a. In an embodiment, the value 0110 can indicate that streaming and data traffic should be offloaded. Based on this broadcasted value, one or more policies (or subsections of policies) at each mobile communication device 140 in group 600a become valid (e.g., policies for streaming and data), and certain other policies are not valid (e.g., policies for voice). The validity of one or more policies (or subsections of policies) can be determined using a logical operation. The content of the valid policy is then evaluated. In an embodiment, the content of the policy contains a set of filters that determines how traffic should be offloaded.

For example, in an embodiment, the logical operation is a binary AND operation. If a policy has, for example, a bit vector of 0100, the policy is determined to be valid because 0110 AND 0100 provides a logic output of 0100 that evaluates to a value greater than 1 (i.e. includes at least one logic "1"). If a policy has, for example, a bit vector of 1000, the policy is determined to be invalid because 0110 AND 1000 does not evaluate to a value greater than 1. While policies are evaluated using an AND operation in this example, it should be understood that any binary operation can be used to determine whether policies are valid.

Figure 9:
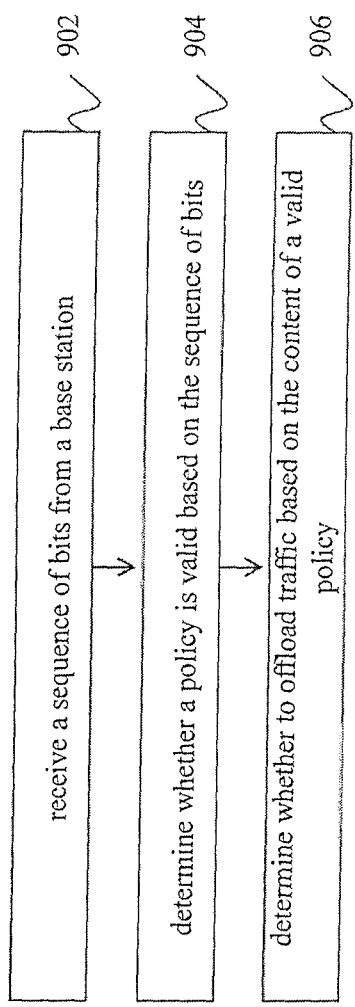
FIG. 9 is a flowchart of a method for offloading traffic for users in a user group using a bitmap allocation technique in accordance with an embodiment of the present disclosure.

FIG. 9 is a flowchart of a method for offloading traffic for users in a user group using a bitmap allocation technique in accordance with an embodiment of the present disclosure. In step 902, a mobile communication device 140 receives a sequence of bits $V_B$ from the base station 120. In step 904, the mobile communication device 140 whether a policy (e.g., stored in memory 460) is valid based on the sequence of bits (e.g., based on the results of a binary operation). The mobile communication device 140 can determine whether to offload traffic based on the content of a valid policy (e.g., based on a set of filters that determines how traffic should be offloaded) in step 906. In an embodiment, the mobile communication device 140 can perform these steps using instructions stored in memory 460 and executed on CPU 450.

5. Ran Based Solution for WLAN Offloading

In an embodiment, when ANDSF is not present either on the network or on mobile communication device(s) 140, or when the ANDSF policies are not valid, an alternative solution may be provided using Radio Access Network (RAN) rules. For example, using RAN rules, information including the offloading thresholds described above can come from the policy and a charging rules function (PCRF) in a server of a network and can be transmitted to the mobile communication device(s) 140.

FIG. 10 is a network diagram illustrating how the PCRF 1002 can provide threshold information to the mobile communication device(s) 140 using RAN rules in accordance with an embodiment of the present disclosure. In FIG. 10, the PCRF 1002 determines transfer parameter information, including the internal OPI threshold level. In an embodiment, the transfer parameter information can include further information, such as the preferred radio access technology (RAT), whether IP address preservation is required, and/or whether trusted access is required for the WLAN domain. The PCRF sends this information to the public data network gateway (P-GW) 1004.

The P-GW 1004 sends the transfer parameter information towards the Mobility Management Entity (MME) 1008 via the signaling gateway (S-GW) 1006 using a Non-access Stratum (NAS) message. Upon establishment of a public data network (PDN) connection, the P-GW 1004 can use the Protocol Configuration Options (PCO) parameter of the NAS message to indicate to the mobile communication device(s) 140 whether the traffic carried on the underlying PDN connection is offloadable to WLAN. In an embodiment, the "additional parameter list" in the PCO options field can be extended to include the transfer parameters, including the OPI threshold level, determined by the PCRF.

The MME 1008 has a signaling component that enables it to transmit data to the mobile communication device(s) 140 through base station 120 (e.g., using NAS signaling). Once the MME 1008 transmits the transfer parameters to the base station 120, the base station 120 determines which mobile communication(s) 140 should be sent RAN rules and sets the RAN rules parameters. The base station 120 then sends the RAN rules including transfer parameters information to the mobile communication device(s) 140. Once the mobile communication device(s) 140 receive the RAN rules, the mobile communication device(s) 140 discover WLAN information (e.g., SSIDs) and AP capabilities. The mobile communication device(s) 140 can then decide whether to perform an offload or not. For example, the mobile communication device(s) 140 can determine whether to offload based on their individual policies and the OPI threshold information transmitted by the base station 120 using, for example, the technique(s) described above. For example, in an embodiment a specific mobile communication device 140 can determine, based on its policy, which services its policy states should be offloaded given the received OPI threshold information.

In an embodiment, the mobile communication device(s) 140 use the RAN rules for both network selection and traffic steering. For example, based on the RAN rules, each mobile communication device 140 selects a WLAN access point that fulfills the RAN rules provided (e.g., based on the preferred RAT, whether IP address preservation is required, and/or whether trusted access is required for the WLAN domain, as specified in the RAN rules based on the information provided by the PCRF 1002).

In an embodiment, based on the information from the PCRF 1002, the format of the RAN rules includes the validity and condition of the source RAT, the validity and condition of the target RAT, and flow and/or Access Point Name (APN) based information. In an embodiment, when moving from the Evolved Universal Terrestrial Radio Access (E-UTRA) to WLAN, the validity condition of the source RAT depends on the interference level at each mobile communication device 140, whether each mobile communication device 140 is at the edge of serving cell 110, and/or the OPI threshold level. When moving from WLAN to E-UTRA, the validity condition of the source RAT depends on whether the minimum achievable throughput over WLAN is below a threshold level.

In an embodiment, when moving from E-UTRA to WLAN, the validity condition of the target RAT depends on whether the minimum achievable throughput over WLAN is above a threshold level and WLAN AP access capabilities (e.g., trusted vs. untrusted access, single vs. multiple PDN support, etc.). When moving from WLAN to E-UTRA, the validity condition of the target RAT depends on the interference level at each mobile communication device 140, whether each mobile communication device 140 is at the edge of serving cell 110. In an embodiment, the flow and/or APN based information contains, for each rule, a mandatory node identifying the data traffic (e.g., based on an APN or IP flow description).

FIG. 11 is a flowchart of a method for providing threshold information to mobile communication device(s) using radio access network (RAN) rules in accordance with an embodiment of the present disclosure. In step 1102, the PCRF 1002 provides transfer parameter information including an OPI threshold level and sends it to the P-GW 1004. For example, in an embodiment, the PCRF is implemented on a server and executes code, using processing circuitry on the server, for determining and providing the transfer parameter information to the P-GW 1004. In step 1104, the P-GW 1004 sends the transfer parameter information to the MME 1008 via the S-GW 1006 and includes the OPI threshold level in the PCO parameter (e.g., by extending the "additional parameter list" in the PCO parameter). For example, in an embodiment, the P-GW is implemented on a server and executes code, using processing circuitry on the server, to include the OPI threshold level in the PCO parameter. The MME 1008 can then send, using processing circuitry on the MME, the transfer parameter information to the base station 120 using a signaling technique (e.g., NAS signaling).

In step 1106, the base station 120 determines which mobile communication device(s) 140 to send RAN rules to. For example, in an embodiment, the base station 120 can, using instructions stored in memory 260 that are executed on CPU 250, determine which mobile communication device(s) 140 to send RAN rules to. In step 1108, each mobile communication device can determine whether to offload traffic (e.g., based on code and a policy stored in the memory 460 and using the CPU 450).

6. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way. The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific circuits (ASIC), digital signal processors, etc., as will be understood by those skilled in the art based on the discussion given herein. Accordingly, any processor that performs the signal processing functions described herein is within the scope and spirit of the present disclosure. The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A mobile communication device, comprising:
   a first transceiver configured to wirelessly communicate with a long term evolution (LTE) network;
   a second transceiver configured to wirelessly communicate with a wireless local area network (WLAN); and
   processor circuitry coupled to the first transceiver and the second transceiver, wherein the processor circuitry is configured to:
      receive a numerical value from a base station associated with the LTE network, wherein the numerical value is represented by a plurality of bits, and wherein each bit in the plurality of bits of the numerical value corresponds to a different offloadable service of a plurality of offloadable services;
      determine which offloadable services of the plurality of offloadable services should be offloaded based on each corresponding bit in the plurality of bits of the numerical value; and
      control an offload of one or more of the offloadable services based on the determination.

2. The mobile communication device of claim 1, wherein the numerical value is represented by a predetermined subset of a set of bits transmitted to a plurality of devices camped on a serving cell of the base station.

3. The mobile communication device of claim 2, wherein the predetermined subset of the set of bits is determined based on a user group assigned to the mobile communication device.

4. The mobile communication device of claim 2, wherein the predetermined subset of the set of bits is determined based on a class of a subscriber of a service provided to the mobile communication device.

5. The mobile communication device of claim 1, wherein the processor circuitry is further configured to:
   perform a logical operation on each bit of the plurality of bits of the numerical value; and
   determine which offloadable services of the plurality of offloadable services should be offloaded based on respective outcomes of the logical operations.

6. The mobile communication device of claim 1, wherein the plurality of offloadable services includes two or more of audio, video, data, or signaling, services.

7. The mobile communication device of claim 1, wherein the plurality of offloadable services includes audio, video, data, and signaling services.

8. A method, comprising:
   receiving, by a mobile communications device, a numerical value from a base station, wherein the numerical value is represented by a plurality of bits, and wherein each bit in the plurality of bits of the numerical value corresponds to a different offloadable service of a plurality of offloadable services;
   determining, using the mobile communications device, which offloadable services of the plurality of offloadable services should be offloaded based on each corresponding bit in the plurality of bits of the numerical value; and
   controlling an offload of one or more of the offloadable services based on the determination.

9. The method of claim 8, wherein the numerical value is represented by a predetermined subset of a set of bits transmitted to a plurality of devices camped on a serving cell of the base station.

10. The method of claim 9, wherein the predetermined subset of the set of bits is determined based on a user group assigned to the mobile communications device.

11. The method of claim 9, wherein the predetermined subset of the set of bits is determined based on a class of a subscriber of a service provided to the mobile communications device.

12. The method of claim 8, wherein the plurality of offloadable services includes two or more of audio, video, data, or signaling services.

13. The method of claim 8, wherein the plurality offloadable services includes audio, video, data, and signaling services.

14. The method of claim 8, further comprising:
   performing, using the mobile communications device, a logical operation on each bit of the plurality of bits of the numerical value; and
   determining, using the mobile communications device, which offloadable services of the plurality of offloadable services should be offloaded based on respective outcomes of the logical operations.

* * * * *